United States Patent [19]

Webb et al.

[11] Patent Number: 5,195,465
[45] Date of Patent: Mar. 23, 1993

[54] FLAKED CELLULOSE LITTER MATERIAL WHICH CAN BE REUSED AS FOOD OR FERTILIZER

[75] Inventors: John L. Webb, Richmond; Robert D. Kilgore, Rosharon; Shitalprasad N. Patil, Houston, all of Tex.

[73] Assignee: International Cellulose Corporation, Houston, Tex.

[21] Appl. No.: 746,938

[22] Filed: Aug. 19, 1991

Related U.S. Application Data

[63] Continuation-in-part of Ser. No. 383,167, Jul. 20, 1989, Pat. No. 5,082,563.

[51] Int. Cl.⁵ ............................................. A01K 1/015
[52] U.S. Cl. ................................................. 119/172
[58] Field of Search ............................. 119/171, 172

[56] References Cited

U.S. PATENT DOCUMENTS

| | | |
|---|---|---|
| 12,882 | 5/1855 | Weiser . |
| 374,208 | 12/1887 | Sewall . |
| 1,718,507 | 6/1929 | Wenzel et al. . |
| 1,978,125 | 10/1934 | Bennett .................... 91/68 |
| 2,179,591 | 11/1939 | Godchaux . |
| 2,470,641 | 5/1949 | Portz ....................... 252/62 |
| 2,553,731 | 5/1951 | Oliver ...................... 117/137 |
| 3,027,326 | 3/1962 | Moffett .................... 252/62 |
| 3,675,625 | 7/1972 | Miller et al. ............. 119/1 |
| 3,980,050 | 9/1976 | Neubauer ................ 119/172 |
| 4,082,532 | 4/1978 | Imhof ....................... 71/8 |
| 4,085,704 | 4/1978 | Frazier ..................... 119/1 |
| 4,187,983 | 2/1980 | Boyer ....................... 239/9 |
| 4,258,660 | 3/1981 | Pris et al. . |
| 4,263,873 | 4/1981 | Christianson ............ 119/1 |
| 4,296,709 | 10/1981 | Schulein, Jr. . |
| 4,343,680 | 8/1982 | Field et al. ............... 162/100 |
| 4,360,440 | 11/1982 | Boyer et al. ............. 252/62 |
| 4,374,794 | 2/1983 | Kok .......................... 264/122 |
| 4,407,231 | 10/1983 | Colborn et al. ......... 119/1 |
| 4,519,918 | 5/1985 | Ericsson et al. ......... 210/680 |
| 4,560,527 | 12/1985 | Harke et al. ............. 119/172 |
| 4,570,573 | 2/1986 | Lohman ................... 119/172 |
| 4,621,011 | 11/1986 | Fleischer ................. 119/172 |
| 4,625,679 | 12/1986 | Hill .......................... 119/172 |
| 4,721,059 | 1/1988 | Lowe et al. .............. 119/172 |
| 4,794,022 | 12/1988 | Johnson et al. ......... 427/212 |
| 4,813,996 | 3/1989 | Gardner et al. ......... 119/172 |
| 4,821,677 | 4/1989 | Harrison . |
| 4,829,045 | 5/1989 | Fransham ................ 502/401 |
| 4,923,121 | 5/1990 | Boyer ....................... 239/434.5 |
| 4,924,808 | 5/1990 | Pirotte ..................... 119/171 |
| 4,931,139 | 6/1990 | Phillips .................... 162/100 |
| 4,949,672 | 8/1990 | Ratcliff et al. .......... 119/1 |
| 5,009,908 | 4/1991 | Molaug et al. .......... 426/454 |
| 5,014,650 | 5/1991 | Sowle et al. ............. 119/171 |
| 5,018,482 | 5/1991 | Stanislowski ............ 119/173 |
| 5,044,324 | 9/1991 | Morgan et al. .......... 119/171 |

FOREIGN PATENT DOCUMENTS

| | | |
|---|---|---|
| 1107267 | 8/1981 | Canada . |
| 0039522 | 11/1981 | European Pat. Off. . |
| 0094363 | 11/1983 | European Pat. Off. . |
| 0115898 | 8/1984 | European Pat. Off. . |
| 0223431 | 5/1987 | European Pat. Off. . |
| 0331207 | 9/1989 | European Pat. Off. . |
| 1542263 | 5/1970 | Fed. Rep. of Germany . |
| 2205641 | 11/1972 | Fed. Rep. of Germany . |
| 2725687C2 | 12/1978 | Fed. Rep. of Germany . |
| 118199 | 2/1947 | Sweden . |

OTHER PUBLICATIONS

Composted Municipal Garbage for Broiler Litter, by Malone et al, 1982.
Influence of Litter Type and Size on Broiler Performance 1. Factors Affecting Litter Consumption. Malone et al. 1982.
Recycled Paper Products as Broiler Litter, by Malone et al., 1982.

(List continued on next page.)

*Primary Examiner*—John J. Wilson
*Assistant Examiner*—Todd Manahan
*Attorney, Agent, or Firm*—Guy McClung

[57] ABSTRACT

Cellulose flakes and methods for making them; in one aspect the flakes useful as animal litter or bedding; in another aspect such used flakes repelletized for use as litter, food or fertilizer; and in another aspect the flakes or re-pellets having desirable additives added to them.

16 Claims, 1 Drawing Sheet

OTHER PUBLICATIONS

Influence of Litter Type and Size on Broiler Performance 2. Processed Newspaper Litter Particle Size and Management by Malone et al., 1982.
"SorbaSolv", Omni Division of Ajax NERAC Search Report, refers to numerous prior art references.
"K-13 fc Ceiling Systems Acoustics and Noise Control", International Cellulose Corporation, 1987.
"Conwed Industrial Sorbent Products", Conwed Bonded Fiber, May 1984.
"Animal Bedding—A Capital Idea", Resource Recycling, Jul. 1990.
"Broiler Litter Makes Hits Stocker Program Work", Progressive Farmer, Jun. 1991.
"Cows Munch Litter Pellets", Progressive Farmer, May 1991.
"Waste Age's Recycling Times", Sep. 25, 1990.
Cincinnati Fiber, Inc., "Material Safety Data Sheet", 1987.
International Cellulose Corporation, "Celbar 2 Loose Fill Cellulose Insulation", Feb. 1988.
Cincinnati Fiber, Inc., "Cell Dry (TM)-Gobbler (TM)," dated prior to May, 1988.
Oil-Dri Corporation of America, "Oil-Dri", (product bag) 1983.
Absorptive Technoiogy, Inc., "Kitty Flush", (product bag), dated prior to May, 1988.
Balcones Mineral Corp., "Absorb-N-Dry", (product bag) dated prior to May, 1988.
J. V. Manufacturing Co., Inc., "Hydrovac", 1987.
New Pig Corporation, "Only a Pig Can Eat All This", 1987.
Sorbent Products Co., Inc., "The SPC Solution", dated prior to May, 1988.

FLAKED CELLULOSE LITTER MATERIAL WHICH CAN BE REUSED AS FOOD OR FERTILIZER

RELATED APPLICATION

This is a continuation-in-part of U.S. application Ser. No. 07/383,167 filed on Jul. 20, 1989, now U.S. Pat. No. 5,082,563.

BACKGROUND OF THE INVENTION

1. Field Of The Invention

This invention relates to processed cellulose material for use as an animal litter, as a food, and as a fertilizer which, in various particular aspects, is pelletized or flaked.

This invention also relates to methods for cleaning up a liquid floating on or in another liquid and to absorbent pellets useful in such methods. In one embodiment, this invention relates particularly to methods for cleaning up oil spills in salt water using cellulose pellets of a preferred size, configuration and density. This invention relates to methods for making absorbent pellets and to the pellets themselves.

2. Description Of The Prior Art

A variety of materials have been used as litter for animals. These materials have included grass, hay, leaves, grain hulls, sawdust, wood shavings, and other natural materials as well as material such as shredded or macerated paper. A variety of problems are associated with the use of these materials. Shredded or macerated paper readily absorbs liquids, including animal urine, but easily becomes saturated, losing its ability to dry up urine. Such paper also becomes packed down by the weight of the animals and loses its loft; i.e., it does not serve well as a bedding for animals, e.g. cattle and horses. Such paper which has not been sterilized or dried prior to use as a litter or bedding provides a prime site for bacterial or fungal growth and for ammonia production, particularly when aided by animal urine or manure. Natural materials which already have bacteria or other microorganisms on them and which have not been dried or sterilized also provide a prime site for such growth and production.

Prior art feed pellets made from chicken litter (75% litter, 25% grain; 50% litter, 50% corn) are relatively low in nitrogen content so grain or corn is added. Also such pellets have little or no trace minerals which add nutritional value.

Various methods, materials, and apparatuses have been used to clean up liquid spills such as oil spills. These methods, materials, and apparatuses are ineffective at best and costly, and non-productive at worst. Several weeks after the Exxon Valdez oil spill, only a small percentage of the spilled oil had been cleaned up. Even with spills of lesser magnitude, the clean up devices are complex and expensive and the methods are ineffective.

There has long been a need for an effective animal litter. There has long been a need for such a litter in which bacteria growth is inhibited or in which bacteria (or other unwanted organisms, fungi, molds, toxins, etc.) does not grow as well as in prior art litters. There has long been a need for such a litter which disposed of in a useful way or which can be reprocessed to produce a food or fertilizer. There has long been a need for a quick and efficient method for cleaning up spilled hazardous, obnoxious, or toxic materials, including but not limited to, oil, chemicals, and petroleum products.

There has long been a need for a method for cleaning oil spills which itself does not result in other environmental or disposal problems. There has long been a need for a method for cleaning up material spills which permits recovery or re-use of some of the spilled material. There has long been a need for a product for use in such methods.

In accordance with the duty of candor before the Patent and Trademark Office, the following are disclosed:

"Animal Bedding—a capital idea," Resource Recycling, July, 1990 discusses the use of shredded newspaper as animal bedding and lists fifteen reasons (page 46) why paper bedding is preferred to other bedding materials. Various machines are also disclosed.

"Broiler Litter Makes Hits Stocker Program Work," Progressive Farmer, June, 1991, discusses the use of broiler litter blended half and half with corn as calf feed and a 55% litter—45% corn, plus hay, feed for steers.

"Cows Munch Litter Pellets," Progressive Farmer, May, 1991, discloses steam cooking a mixture of grain and broiler litter into feed pellets (75% litter, 25% grain), in a process that kills active bacteria and produces a pellet with a high protein content. This reference mentions problems with litter disposal and with drugs used in broiler rations.

"Waste Age's Recycling Times," Sep. 25, 1990, discusses in general the recycling of old newspaper, particularly pages 1, 3, 5, 9, 11.

U.S. Pat. No. 4,360,440, commonly owned with this application, discloses an insulating mixture with cellulose for fiber, water, and adhesive.

U.S. Pat. No. 4,187,983, commonly owned with this application, discloses a spray nozzle for spraying a multi-component insulating mixture of insulating fibers and adhesive.

U.S. patent application Ser. No. 07/259,968 commonly owned with this application, discloses a nozzle for spraying insulating material mixtures including cellulose fibers.

U.S. Pat. No. 3,027,326 discloses a shredded fiber insulating material treated to improve resistance to charring and to provide a lower coefficient of heat transfer.

U.S. Pat. No. 2,553,731 discloses flame resistant cellulose fibers.

U.S. Pat. No. 2,470,641 discloses a cellulose insulation material made from disintegrated newspaper and boric acid powder.

U.S. Pat. No. 1,978,125 discloses a method for applying an insulation mixture including cellulose (paper) fiber.

U.S. Patent 1,718,507 discloses a method for applying an insulating mixture including cellulose material.

U.S. Pat. No. 374,208 discloses a process for preserving wood.

U.S. Pat. No. 12,882 discloses an insulation material including macerated waste paper and forming a paste.

Cincinnati Fiber, Inc., "Material Safety Data Sheet," 1987 discloses cellulose fiber produced from recycled newspaper for use as an absorbent.

International Cellulose Corporation (assignee of present invention and this application), "Celbar 2 loose fill cellulose insulation," February 1988, discloses insulating cellulose fibers.

International Cellulose Corporation, "K-13 fc ceiling systems," 1987 discloses an insulating material including cellulose fibers.

Cincinnati Fiber, Inc., "Cell Dry (TM)-Gobbler (TM)," dated prior to May, 1988, discloses absorbent tubes with a granular absorbent having a wicking action suitable for absorbing oil or other liquids.

Oil-Dri Corporation of America, "Oil-Dri," (product bag) 1983, discloses ground clay for soaking up liquid spills on surfaces, including oil spills on floors, workbenches, and driveways.

Absorptive Technology, Inc., "Kitty Flush," (product bag), dated prior to May, 1988, discloses an absorbent cellulose fiber for, among other things, absorbing water and oil spills.

Balcones Mineral Corp., "Absorb-N-Dry," (product bag) dated prior to May, 1988, discloses absorbent granular calcined clay for absorbing oil, grease, odors, moisture, and liquids.

J.V. Manufacturing Co., Inc., "Hydrovac," 1987 discloses a vacuum system for cleaning up spills of hazardous materials, including oil. The brochure mentions U.S. Pat. No. 4,194,978.

New Pig Corporation, "Only A Pig Can Eat All This," 1987, discloses devices with a superabsorbent material for cleaning up spills of hazardous materials.

Conwed Corp., "Conwed Industrial Sorbent Products," 1984, discloses sorbent devices with a water-resistant biodegradable natural fiber mat reinforced with polypropylene mesh which, after clean up, can be wrung out to reclaim the absorbed material or can be incinerated.

Sorben Products Co., Inc., "The SPC Solution," dated prior to May, 1988, discloses devices and pads using a non-biodegradable sorben material and Fiberperl, a combination of cellulose and perlite in particulate, boom, or pillow embodiments.

SUMMARY OF THE PRESENT INVENTION

The present invention in one embodiment is directed to an animal litter made from compacted cellulose (e.g. old newspaper) which has been made into pellets and then flaked, e.g. by crimping and compressing. The pellets are produced in a process which includes a heating step at a sufficient temperature and for a sufficient time period that bacteria and other undesirable living things (organisms, viruses, fungi, molds, eggs, larva, adult insects, microorganisms) are killed, preferably substantially all of them. Also, this process produces a "hot" pellet which dries out (prior to the flaking operation). In this drying step, the pellet opens up somewhat. A dry sterile flaked material provides a less conducive site for the growth of bacteria, fungi, or mold, or for ammonia production. Also, this material produces relatively little dust.

In one process for producing the flaked material according to this invention, the pellets are cut to a size of about half an inch and are then fed between dual opposed rollers of a crimper where they are compressed to increase their surface area.

A fungicide, but not limited to e.g. borax, boric acid, lime or sodium bicarbonate, can be added (e.g. in powdered form) to the flaked material to extend the useful life of litter made from the flaked material. Coloring agents, insecticides and herbicides can also be introduced into the flaked material.

Flaked material made according to this invention can be used as an animal litter for a longer time period than can litters made from natural materials or from other materials that are not processed as described herein. Due to the configuration, density, and size of flakes of the flaked material, urine or other liquids is more readily absorbed and cannot as easily flow through a mass of the material as it can, e.g., through a mass of shredded paper. This inhibits the formation of puddles beneath the material, thus inhibiting the formation of bacteria breeding sites.

In another embodiment of this invention, flaked material which has been used as an animal litter, and has absorbed animal urine and liquids from manure (e.g. but not limited to chicken manure), is made into pellets in a pelletizing process in which, in a heating step, bacteria and other undesirable living organisms are killed. This sterilized repelletized material is an excellent food source for animals, including but not limited to poultry and ruminant animals. Additives for such re-pelletized material include medicines, minerals and vitamins. In another embodiment flaked material that has been used as litter is introduced back into a pelletizing machine with an additional amount of conditioned cellulose fiber to produce a material that is then flaked and used as a litter or as a food source. This process may be repeated.

Flaked material according to this invention is digestible by poultry so that it does not compact in their gizzards as do some other prior art litters.

Flaked material used as litter for animals may also be re-pelletized, with or without a killing-heating step, to produce a pellet usable as fertilizer.

By appropriately sizing the flaked material according to the present invention, compaction of the material by animal weight is reduced and the tendency of the material to adhere to animal feet (e.g. to the feet of poultry or cattle) is reduced. In one embodiment pieces of the material are irregularly shaped and are about one-half inch long, about one-fourth inch wide and about one-eighth inch thick and their density is about 15 to about 22 pounds per cubic foot. Enough of the material is used, preferably, to absorb urine and manure, to control odor, and to prevent build-up on animal feet. Such material is not as easily moved around by animals as, e.g., shredded newspaper; i.e., material according to this invention stays more uniformly in place to cover a given area.

Due to the relatively dry and sterile nature of flaked material according to the present invention, when the material is used as animal litter, it can be removed before it emits an inordinate amount of undesirable odor, e.g. due to ammonia. This makes it easier to either dispose of or work with later.

Certain embodiments of the present invention are directed to: methods for absorbing a first liquid floating on or in a second liquid by using absorbent pellets; to absorbent pellets; and to methods for making the pellets; and to pellets produced by the absorption method. One embodiment of an absorbing method according to this invention for use in cleaning up a first liquid floating on or in a second liquid includes the steps of introducing pellets, preferably made from cellulose, onto or into the first liquid which pellets absorb some or all of the first liquid and then sink beneath the location of the first liquid to a point at which they are recovered or to the bottom of the container, reservoir, or body of the second liquid. In another embodiment, the pellets can be recovered from the location of the first liquid before they sink. In another embodiment of the method, a surfactant sprayed on the pellets may facilitate absorption of the first liquid and decrease the time necessary to cause sinking of the pellets.

In at least preferred embodiments, pellets according to this invention, have a preferred range of densities. In other preferred embodiments, pellets have a preferred range of sizes. In other preferred embodiments, pellets have various preferred configurations. One specific preferred pellet has a preferred range of densities, a preferred range of sizes, and a preferred configuration.

In certain embodiments it is preferred that the flaked material for use as a litter (or for re-use as described above) be formed so that pieces of the flaked material are ridged for additional structural strength and integrity.

One embodiment of a method for making cellulose pellets according to this invention includes the steps of preparing raw cellulose such as paper into a form that can be introduced to subsequent pelletizing steps. In one embodiment, correctly sized cellulose particles are conditioned with water then fed to and through a pelletizing machine which produces pellets. In a preferred embodiment, these pellets are then sized and shaped to desired specifications. Some or all of the undesirable pellets and particles (e.g., dust) can be removed (and re-used). The resulting compressed pellets are useful in various methods. From an amount of compressed pellets that are then flaked, dust and pieces of undesirable size and configuration are also, preferably, removed, e.g. by shaker screens.

There are, therefore, objects of at least certain preferred embodiments of the present invention as follows:

To provide new, useful, unique, effective and nonobvious material for use as animal litter, food, or fertilizer;

To provide such material for use as animal litter which is relatively dry and sterile for inhibiting the growth of undesirable living organisms including bacteria;

To provide such material which serves as a soft animal bedding material not as subject to compaction as certain prior art materials;

To provide such material which produces relatively little dust;

To provide such material which is combinable with a fungicide, herbicide, insecticide, and/or coloring material;

To provide such material with relatively higher absorption which can be used for a longer time period as a litter than certain prior art materials;

To provide such a material which can be re-pelletized for use as litter, food, fertilizer, or mulch;

To provide such materials which can have various beneficial additives;

To provide such materials which are biodegradable;

To provide a new, unique, useful, and nonobvious method for absorbing a first liquid floating in or on a second liquid; e.g., but not limited to, a method for cleaning up oil spills in fresh or salt water;

To provide such materials which are corrugated for added strength and integrity;

To provide new, unique, and nonobvious pellets for absorbing a first liquid floating on or in a second liquid; e.g., but not limited to, cellulose pellets of a particular size, configuration, and density;

To provide new, unique, useful, and nonobvious methods for fabricating such pellets for use in such methods;

To provide new, unique, useful, and nonobvious methods for using such pellets and such methods to produce a pellet which has absorbed combustible material or petroleum products and can subsequently be used as a fuel pellet or can be introduced into a recovery process for recovering the petroleum product, or to produce a pellet which can absorb a liquid and which can then be treated or handled to remove the liquid;

To provide a method for cleaning up oil spills in which the pellets used absorb oil floating on water and then sink to the bottom where they biodegrade;

To provide such a method which works well with either natural agitation of the water such as by wind or wave action or in which artificial agitation can be employed to facilitate absorption and to speed-up sinking of the pellets;

To provide a method in which pellets are recovered from a layer of oil or other material before they sink or before they come to rest on the bottom of the container or reservoir, either manually or by mechanical means;

To provide a method in which pellets can be used to absorb a combustible material such as crude oil and hold it at or near the surface of another liquid so that it (and the pellets) can be burned before it mixes with the other liquid or sinks;

To provide a method for producing a cellulose pellet for use in the other methods according to this invention, including the steps of grinding raw paper in a mill to produce particles or pieces which are conditioned with water and metered to a pelletizing machine in which it is extruded to produce pellets of increased density; the pellets are dried, sized, and shaped;

To provide pellets useful in all of the methods described herein;

To satisfy the long-felt needs for a quick and efficient method for cleaning up spilled hazardous, toxic, or obnoxious materials such as chemicals, petroleum products, and crude oil;

To satisfy the long-felt need for a method for cleaning up material which permits recovery or re-use of some of the material;

To satisfy the long-felt need for a method for cleaning up such spills which itself does not result in other environmental or disposal problems;

To satisfy the long-felt need for a produce useful in such methods;

To provide methods for controlling a first liquid floating in or on a second liquid; particularly oil floating on water;

To provide compressed absorbent pellets, preferably made from newsprint, which are designed and made to float or sink after absorbing an unwanted liquid, depending on the particular application.

The present invention recognizes and addresses the previously-mentioned long-felt needs and provides an elegant, creative and satisfactory meeting of those needs in its various embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying materials. Although these descriptions are detailed to insure adequacy and aid understanding, this is not intended to prejudice that purpose of a patent which is to claim an invention no matter how others may later disguise it by variations in form or additions or further improvements. The claims at the end of this specification are intended for this purpose.

BRIEF DESCRIPTION OF THE DRAWING AND OF THE PHOTOGRAPHS

So that the manner in which the above-recited features, advantages and objects of the invention, as well as others which will be better understood, a more particular description of the invention briefly summarized above may be had by reference to the detailed description of certain preferred embodiments thereof, and the materials which are illustrated in the appended photographs which form a part of this specification. It is to be noted, however, that the appended photographs illustrate preferred embodiments of the invention and are therefore not to be considered limiting of its scope, for the invention may admit to other equivalent and equally effective embodiments.

Photographs A through G are of pellets according to the present invention.

Figure 4:
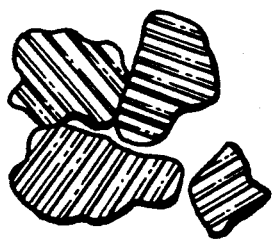
Figure 5:
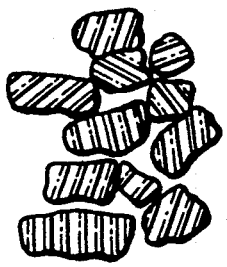
Figure 6:
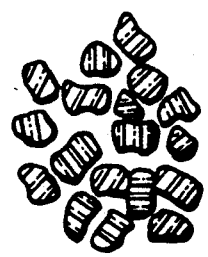

FIGS. 4-6 shows various sized corrugated flaked material according to the present invention.

DESCRIPTION OF PREFERRED EMBODIMENTS

In one preferred embodiment of a process according to the present invention for producing absorbent pellets, cellulose in sheet or board form, preferably Kraft paper, cardboard, or newsprint, with newsprint most preferred, is ground up. The newsprint is fed into a commercially available first stage mill that reduces the paper to pieces in the range of about one inch to about one and a half inches. These pieces are then fed to a finishing mill where they are further reduced to pieces in the range of about one-eighth inch to one-fourth inch in size (largest dimension). These pieces of newsprint are then conditioned with a water spray. [For liquid absorption pellets, it is preferred that the moisture content be in the range of about 12% to about 14% weight, with 13% preferred. For flaked material (crimped and compressed pellets) to be used as litter, it is preferred that the water content be between about 12% to about 20% by weight (with about 15% to about 18% preferred).]

The conditioned newsprint material is then fed into a special pelletizing machine (commercially available model machine 26-300 made by Sprout Bauer Company), that extrudes the material through a die to form pellets. The conditioned newsprint at about four to about seven pounds per cubic foot is fed to the pelletizing machine to produce pellets which are in the preferred density range of about 37 to 47 pounds per cubic foot. The size of the pellets produced by the machine varies. In one embodiment a preferred pellet is generally cylindrical and has a diameter in the preferred range of about one-eighth inch to about one-fourth inch and a length in the preferred range of about one-eighth inch to about three-fourths inch long; the preferred density for this pellet is about 42 pounds of cellulose material per cubic foot. It is preferred that these pellets be dried and the preferred range of moisture content after drying is from about 8% moisture by weight to about 10% moisture by weight. These dried pellets are then further processed; two preferred embodiments resulting from further processing are flaked material (described below) and pellets (described below).

Figure 1:
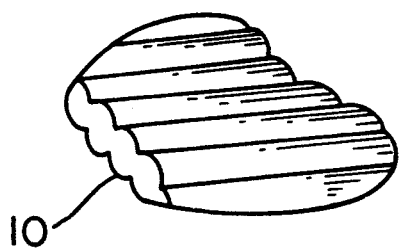
FIG. 1 is a perspective view of a piece of corrugated flaked material according to the present invention.
Figure 2:
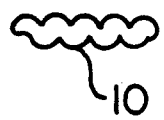
FIG. 2 is an end view of a piece of a corrugated flaked material according to the present invention.
Figure 3:
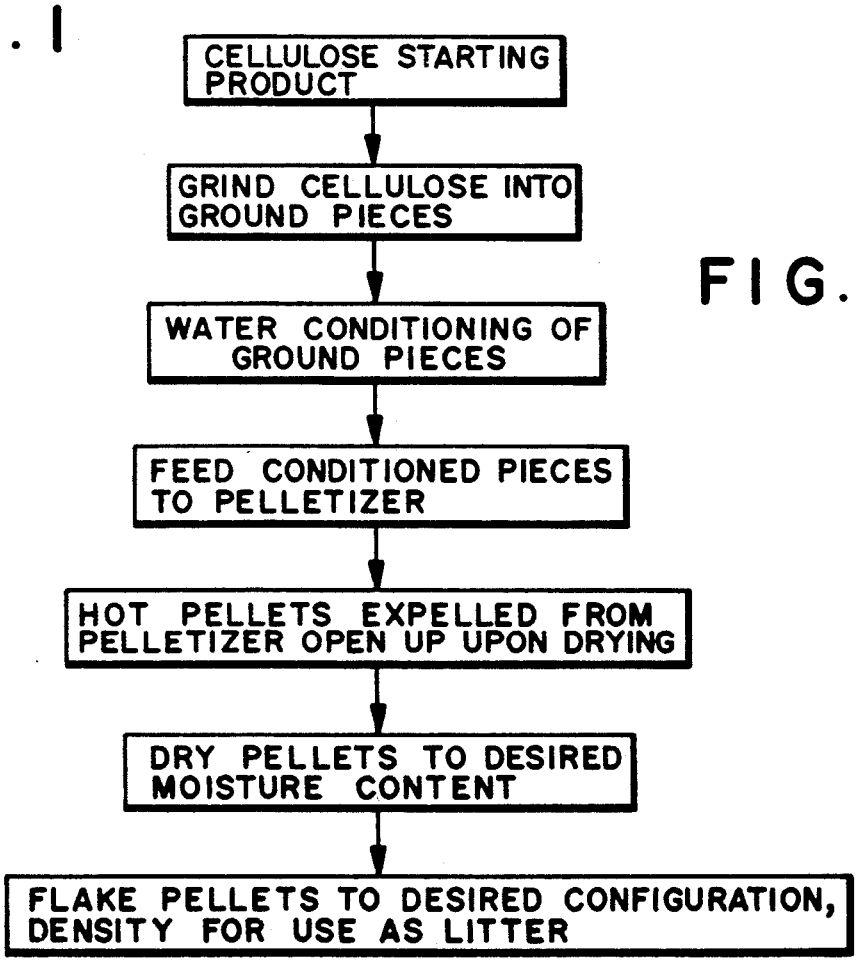
FIG. 3 shows the process according to the present invention.

In one embodiment the conditioned newsprint material is heated in the pelletizing machine sufficiently to kill undesirable living organisms, e.g. mold and bacteria. The dried cellulose pellets, in this embodiment, range preferably between about one-eighth inch to about three-quarters inch in length with a length of about one-half inch preferred. These pellets are then fed to a roller mill (e.g., Model FRC 936, Roskamp Co.) wherein they are compressed and flattened between dual opposed rollers which increase the material's surface area, preferably by at least 35% and produce a flaked material. It is preferred that the density of the flaked material range between about 15 to about 22 pounds per cubic foot, with about 20 pounds per cubic foot preferred. It is preferred that the flaked material be about one-eighth to about five-sixteenth of an inch in size. Fungicides such as borax or sodium bicarbonate may be added to these flakes. This flaked material may be used as an animal litter or bedding material. In a preferred embodiment the flakes are dried to a moisture content between about 8% to about 12% by weight. With this size or pieces of flaked material it is possible and it is preferred to impart a regular corrugated shape to the material with the roller mill to increase the surface area, strength and integrity of the pieces. This shape is illustrated by the piece of material 10 (FIG. 1) according to this invention.

In another embodiment of the present invention flaked material as described above (or any cellulose material, pellet or flake) that has been used as animal litter is collected and introduced into a pelletizing machine with or without the addition of cellulose fiber conditioned as described above in which the materials are heated sufficiently to kill undesirable living organisms, preferably substantially all of them. It is preferred that an amount of cellulose equal by weight to about 20% to about 35% of the weight of cellulose in the used litter be added. The pellets thus produced may serve: as food for ruminant animals; litter or as mulch or fertilizer. When used as food, the pellets may have additives added to them such as minerals, vitamins and medicines to make a more complete feed. These pellets are, preferably, between about one-quarter inch and three-quarters of an inch in diameter and between about one inch and three inches in length.

When the material described above is used as an animal litter then collected and re-pelletized to form "re-pellets", the re-pellets may be used as an effective fertilizer. The re-pellets themselves may be broadcast on soil around plants or trees or inserted into the soil or mixed with water or other liquids in a container to be applied to plants or trees. Plant nutrients, fungicides, minerals, insecticides and/or herbicides may be added to the re-pellets when they are to be used as fertilizer.

The flaked material according to this invention is biodegradable, even after use as an animal litter. The flaked material prior to use as an animal litter, or thereafter, is an excellent mulch material.

Table IV presents an analysis of flaked material according to this invention which was used as poultry litter and contained typical turkey urine and manure. The table shows the various food and mineral values contained therein.

TABLE IV

IDENTIFICATION:
POULTRY MANURE PLUS FLAKED MATERIAL

| TEST (% by weight) | AS RECEIVED (Wet) | DRY |
|---|---|---|
| MOISTURE % | 12.88 | 0.00 |
| PROTEIN % | 11.88 | 13.64 |
| ASH % | 5.15 | 5.91 |
| FIBER % | 38.22 | 43.87 |
| CALCIUM % | 0.30 | 0.34 |
| PHOSPHORUS % | 0.03 | 0.03 |
| A.D.F. % | 52.43 | 60.18 |
| A.D.F.N. (PROTEIN EQUIVALENT) % | 1.91 | 2.19 |
| PEPSIN DIGESTIBLE PROTEIN (PROTEIN EQUIVALENT) % | 10.83 | 12.43 |
| POTASSIUM % | 0.59 | 0.68 |
| SODIUM % | 0.12 | 0.14 |
| ARSENIC PPM | 0.00 | 0.00 |
| IRON PPM | 71.90 | 82.53 |
| MANGANESE PPM | 107.60 | 123.51 |
| ZINC PPM | 123.70 | 141.99 |
| COPPER PPM | 613.30 | 703.97 |
| MAGNESIUM PPM | 858.80 | 985.77 |
| SULFUR % | 0.17 | 0.20 |
| MERCURY PPM | 0.00 | 0.00 |
| LEAD PPM | 9.70 | 11.13 |
| CADIMIUM PPM | 0.30 | 0.34 |
| ph | 6.60 | 6.60 |
| SaH - NaCL % | 0.30 | 0.34 |

In another the dried cellulose pellets are fed to a roller mill for sizing and shaping (commercially available model FRC 936 made by The Roskamp Company). The action of the roller mill produces an irregularly shaped pellet along with dust and particles of undesired size. By using a shaker screen, the undesired materials can be separated. In one preferred embodiment, the best density for a cellulose pellet for absorbing oil is in the density range of about 20 pounds of cellulose material per cubic foot to about 30 pounds per cubic foot. The irregularity of shape of this preferred embodiment is a somewhat flattened shape with more surface area than the shape of generally cylindrical non-flattened material of the prior art. Although the type and degree of irregularity as compared to a smooth cylindrical shape has not been quantified, applicants' pellets maintain their position in a first liquid to be absorbed which is floating on a second liquid; the pellets of desired density maintain their position while they are absorbing the first liquid and, in one embodiment, sink in and through the first liquid after absorbing some of the first liquid. The pellets need not become completely saturated with the first liquid; however, they should not be of such a configuration or first liquid without absorbing it or absorbing only an insignificant amount of it. Applicant's pellets cover the spectrum up to, but not including, pellets that sink immediately and, at the other end of the spectrum up to, but not including, pellets that float on the first liquid as described above. Of course sinking and floating can occur with different pellets on different first liquids. The preferred pellets (A,C,E) described above work well with a first liquid which is oil (e.g., crude oil or SAE 90 oil) floating on salt water. Configuration, size, and density can be varied depending on the nature of the first and second liquids.

To present the characteristics and qualities of certain preferred embodiments of pellets and methods according to the present invention, a study was conducted as reflected in Tables I, II, and III. Columns A through G represent data for cellulose pellets according to embodiments of the present invention. Column H presents data for Buckerfield material which is made from cellulose material and commercially available as Kitty Litter (TM). Column I presents data for low-density relatively flat pieces made from cellulose material and commercially available as Kitty Flush (TM). Column K presents data for grey fiber which is made from cellulose and is commercially available as insulation material.

Styrofoam cups were used as containers for salt water onto whose surface was introduced either SAE 90 grade oil or crude.

Each type of pellet was introduced into and onto each type of oil floating on 140 cc's of salty water in a cup which could hold about 200 cc's of liquid. One teaspoon of oil was poured slowly over the water in each cup.

(One teaspoon of SAE 90 grade oil weighed about 5.15 grams; one teaspoon of the viscous crude oil weighed about 4.23 grams). The surface area of the created oil films or slicks in the cups was about 4.91 square inches.

8 grams of each type of absorbent material were spread over the oil in each cup so that each type of absorbent material was used with each type of oil. At regular intervals of time, observations were made regarding the amount of oil absorbed and the amount of absorbent material which had sunk or was still on or in the oil.

Table I presents data for a testing situation in which the water/oil combination was at a temperature of 23 degrees Centigrade and the pH of the water was 7.68. After about 18 hours some of the materials were still floating on the surface of the water/oil combination; but a slight vibration of the cups caused the sinking of virtually all these floating materials.

Table II presents data for a testing situation in which the temperature of the water/oil combination was about 9 degrees Centigrade and the water pH was 8.02. After 20 hours the temperature had risen to 24 degrees Centigrade and some of the materials were still floating; again, a slight vibration caused them to sink.

Table III presents data on the densities of the various materials.

After two hours of such testing as reported in Tables I-III, it was discovered that under these conditions, absorption was faster and pellets sank faster in the warmer water at the lower pH with the lower density oil. After 18 to 20 hours of such testing, it became apparent that pellets sank more with the more viscous crude oil than in the SAE 90 oil. The Buckerfield material (type H) absorbed oil/water faster than the other materials and sunk to the bottom so relatively quickly (in about 10 minutes) that unabsorbed oil remained on the water's surface (about 8% to about 10% of the SAE 90 oil remained; about 15% to about 20% of the viscous oil remained). The flat pieces (type I) absorbed a significant amount of water and sank in about 20 minutes leaving behind about 10% of the SAE 90 oil and about 10% of the viscous oil.

The type C,F, and G pellets (Table I; Table II) of relatively high density (about 29 pounds of cellulose per cubic foot of pellets) were found to absorb oil faster than the other pellets. These pellets sank more in viscous oil than in SAE 90 oil.

Although the type A and B pellets had the same density (about 21.5 pounds of cellulose per cubic foot of pellets), the B pellets were smaller in size and surface area as compared to the A pellets. The B pellets absorbed oil and water more slowly than the A pellets and less of the B pellets sank than the A pellets.

All pellets can absorb both oil and water; but they can be preconditioned to absorb only oil or mostly oil by pretreating them with oil; e.g., spraying them with No. 2 diesel oil. Pellets treated in this way may not readily absorb water thus making them float on top of a first liquid, e.g., oil more readily so that a less dense pellet can be used (e.g., a pellet less dense than certain preferred pellets, a pellet less dense than 20 pounds of cellulose per cubic foot). It is preferred that pretreatment occur during the pellet manufacturing process, preferably prior to the final pelletizing step.

The type E,A, and C pellets performed better than the type B,D, and J (Cincinnati Fiber material) in SAE 90 oil—they absorbed more oil more quickly. Pellets of types A through G absorb the SAE 90 almost completely leaving little or no oil on the surface and about 1% of the oil around the edge of the cups, leaving the water looking clean. With the viscous oil, these pellets left about 2% to 3% of the oil behind around the edge of the cup. The grey fiber (type K) did not sink. These fibers were generally so light that they formed an agglomeration of fibers and floated on the surface. Fibers remaining above the agglomerated fibers did not absorb oil, even after about 18 to 20 hours. The fibers at the bottom of the agglomeration absorbed only about half of the oil.

The commercially available prior art Buckerfield's flushable cat litter (type H) is biodegradable and can absorb up to 150% of its own weight and it is described as useful for spilled oil.

The use of the word "pellet" herein regarding absorbing oil or other liquids floating on a second liquid includes a piece of material which functions as described to produce the desired results and is made by compressing cellulose material or its equivalent. Preferred pellets are irregular and have enough surface area to break the surface tension of a first liquid, e.g., oil, floating on a second liquid, e.g., water. In one embodiment the pellets can be pretreated with oil which makes them repel water so that a less dense pellet can be used for those applications in which sinking is not desired, i.e., in those applications in which the pellets after absorbing the first liquid are to be removed from the surface of the first liquid.

In various preferred embodiments of this invention, pellets are provided which can absorb liquid and from which the absorbed liquid can be recovered and subsequently disposed of or treated further or refined. For example, from pellets which have absorbed spilled crude oil, the crude oil can be extracted or squeezed out. Of course, the pellets can be recovered by any suitable manual or mechanical means from the surface, from beneath the surface, or from the bottom of the reservoir, bay, ocean, or container of the liquid. Recovered pellets can be disposed of without removing the absorbed liquid. Pellets which have absorbed a combustible material according to any of the previously described methods can be used as fuel or can be incinerated to dispose of them. Also, pellets in place on a first liquid floating on a second liquid can be set on fire to burn absorbed combustible material and to assist in the burning of liquid in which they are floating. It is also within the scope of this invention to provide agitation or vibration to a first liquid/second liquid combination to enhance either pellet absorption or sinking or both.

Regarding certain preferred embodiments in which the pellets sink after absorbing a material like oil, if the pellets and the oil will be biodegradable by natural causes, there may be no need to recover them.

In one preferred embodiment of a method according to this invention the use of a surfactant can decrease the amount of time for the pellets (which have absorbed a first liquid, such as oil) to sink. Using cups containing salty water with a heavy crude oil top film and cups containing salty water with a SAE 90 oil top film, pellets of types B through G (Table I) were sprinkled on the oil, one type of pellet per cup, a total, of 10 cups. After 10 minutes, the bulk of the oil has been absorbed in each cup and about 2% to 5% of the pellets had sunk to the bottom of the cups. Then a 0.1% solution of a surfactant (commercially available Witconate AOS (TM) surfactant) was misted onto the top of the still-floating pellets. Immediately almost all of the remaining pellets combined with oil and fell to the bottom of the containers.

The relative absorption rates of different amounts of pellets, pellets of types A,C,E,F, and G according to the present invention were demonstrated, again using the previously described styrofoam cups as reservoirs and using four cups of each type of pellet, placing 2,4,6, and 8 grams of each type of pellet on the oil film (5.15 grams of SAE 90 oil) in each cup. Pellets A,C,E were 20–22 pounds per cubic foot; types E and F, 29 to 30 pounds per cubic foot.

Pellets of types G and F are generally heavier and more uniformly round than pellets of types A,C, and E, and pellets of types E and F were more round than types A,C,E. At 20 minutes after sprinkling the pellets on the liquid, the cups with 4 and 6 grams of pellets of types A,C, and E exhibited the best oil absorption with E being the best. The cups with 8 grams of pellets of types A,C,E, and F showed generally good oil absorption. The type G pellets did not perform as well as the other types at any given weight. Also, after the pellets of type G in the cup with 4 grams of pellets had sunk, stirring the pellets caused release of some of the absorbed oil, and it floated up to the surface. Less absorbed oil was released by pellets of type E in the cup with 4 grams of pellets. Such stirring did not result in the release of oil from the pellets in cups with 6 or 8 grams of pellets. All the cups with only 2 grams of pellets had free unabsorbed oil at 20 minutes after sprinkling the pellets. Slight agitation of the cups containing 2 grams of pellets resulted in almost no pellets sinking. Spraying surfactant on the pellets still floating after about 25 minutes resulted in the sinking of almost all the pellets in the cups with 4,6, or 8 grams of pellets.

In testing the liquid retention of various types of cellulose fibers including Champions Mulch #1; Champions Mulch #2; Conwed Wood; Newsprint; Cardboard, 75% Newsprint/ 25% Cardboard; and 50% Newsprint/50% Cardboard; it was determined that 100% Newsprint was most absorbent and the mulches were the least absorbent. Regarding water absorption, tests revealed that the most absorbent material was Newsprint.

Mulch fiber was shown to be heavier compared to other fibers and it absorbed less water. Newsprint (1%) retained more water. Mulch retained the least.

By compressing cellulose material into pellets according to this invention, relatively more mass (higher density) is utilized in a smaller space to provide relatively more absorbability for a given volume and provide more control of a first liquid (e.g., spilled oil) floating on or in a second liquid (e.g., ocean water). However, in some embodiments, a density which results in premature pellet sinking is undesirable. Compressed pellets fashioned to provide control of an oil spill without sinking will facilitate recovery from the surface. Various biodegrading microorganisms that attack and degrade oil and other materials may be included in compressed pellets of this invention.

FIGS. 4, 5, and 6 show flaked corrugated material according to the present invention. The material in FIG. 4 is generally between about seven-eights inch to about one and one-half inches long (although there are smaller pieces); about one-eighth inch thick at its thickest part; and between about one-sixteenth to about 3/32 inch thick at its thinnest part (i.e., from a valley of a corrugation to an opposing side).

The material in FIGS. 5 and 6 is generally between about three-eighths inch and about one inch long and its thickness is similar to the material of Photograph N.

Thus it is seen that the products and methods of the present invention readily achieve the ends and advantages mentioned as well as other inherent therein. While certain preferred embodiments of the present invention have been described and illustrated for the purposes of disclosure, it will be clear to one of skill in this art who has the benefits of this invention's creative teachings that changes in the preferred products and steps may be made within the scope of the appended claims and without departing from the spirit of the invention. It is realized that changes in the products or methods are possible and it is intended that each element or step recited in any of the following claims and each combination of elements or steps is to be understood as referring to all equivalent elements, steps, or combinations for accomplishing equivalent results in equivalent manner. These claims are intended to cover the invention as broadly as legally possible in whatever form it is utilized.

What is claimed is:

1. A method for producing animal litter comprising:
   grinding cellulose in sheet form to produce ground cellulose,
   reducing the ground cellulose to produce pieces ranging in size in a largest dimension between about one eight and about one fourth of an inch,
   conditioning the pieces with water to a water content between about 12% to about 20% by weight,
   feeding the conditioned pieces having a density between about four to about seven pounds per cubic foot to a pelletizing machine which produces hot pellets and expels them, the pellets opening up upon drying,
   drying the pellets to a water content between about 8% to about 12% by weight, and
   flaking the dried pellets to produce a flaked litter whose density ranges between about 15 to 22 pounds per cubic foot.

2. The method of claim 1 wherein in the flaking step the dried pellets are compressed and flattened between dual opposed rollers in a roller mill, increasing their surface area.

3. The method of claim 2 wherein the pellets' surface area is increased by at least about 15%.

4. The method of claim 3 wherein the pellets' surface area is increased by at least about 35%.

5. The method of claim 1 comprising also collecting the flaked litter after it has been used as animal litter and has absorbed animal excrement, and
   re-pelletizing the collected litter material to form re-pellets.

6. The method of claim 5 including introducing additives into the re-pellets.

7. The method of claim 6 wherein the additives are medicine.

8. The method of claim 6 wherein the additives are plant growth enhancers.

9. A re-pellet produced by the method of claim 6.

10. The method of claim 5 comprising also using the re-pellets as fertilizers for plants.

11. The method of claim 5 comprising also adding additional cellulose to the collected flaked material prior to re-pelletizing it.

12. The method of claim 11 wherein about 20% to about 35% additional cellulose is added to the collected flaked material based on the weight of cellulose in the collected flaked material.

13. The method of claim 5 comprising also feeding the re-pellets to at least one animal.

14. A re-pellet produced by the method of claim 5.

15. Flaked litter produced by the method of claim 1.

16. The method of claim 1 comprising also using the flaked material as animal litter.

* * * * *